United States Patent [19]

Holmstrom

[11] Patent Number: 4,462,639
[45] Date of Patent: Jul. 31, 1984

[54] WHEEL COVER SUPPORT PEDESTAL

[75] Inventor: Roy C. Holmstrom, Lake Orion, Mich.

[73] Assignee: Rockwell International Corporation, Pittsburgh, Pa.

[21] Appl. No.: 402,500

[22] Filed: Jul. 28, 1982

[51] Int. Cl.³ ............................................... B60B 7/06
[52] U.S. Cl. .......................... 301/37 SC; 301/108 SC
[58] Field of Search ............... 301/37 SC, 37 R, 37 C, 301/37 CD, 108 SC, 37 P, 37 S, 37 AT

[56] References Cited

U.S. PATENT DOCUMENTS

| 2,081,582 | 5/1937 | Fergueson | 301/37 R X |
| 2,159,881 | 5/1939 | Booth | 301/37 SC |
| 2,303,854 | 12/1942 | Lyon | 301/37 R |
| 3,998,494 | 12/1976 | Spisak | 301/37 C X |
| 4,067,621 | 1/1978 | Reppert | 301/37 SC X |

Primary Examiner—David A. Scherbel
Assistant Examiner—Russell D. Stormer

[57] ABSTRACT

A wheel cover support pedestal is capable of being mounted centrally on a wheel of the type which includes a radial wall having a central hole therethrough. The hole is snuggly received on a circular hub element of an axle when the wheel is mounted on the axle. The hole is defined by an interior periphery of the radial wall to be generally circular with the periphery including a plurality of circumferentially spaced notches to provide a gap between the periphery at each notch and the circular hub element. The wheel cover support pedestal includes a center portion with an element for securing a center section of a wheel cover thereto. A plurality of leg portions extend from the center portion with each leg portion being aligned with one of the notches and including an extended end which is received within a corresponding gap. The extended end has a radially extending foot to make overlying contact with an inboard side of the radial wall adjacent the gap to cause the center portion to be disposed axially outwardly of an outboard side of the radial wall of the wheel when the wheel cover support pedestal is mounted thereon.

4 Claims, 2 Drawing Figures

WHEEL COVER SUPPORT PEDESTAL

BACKGROUND OF THE INVENTION

1. Field of the Invention

This invention relates to a wheel cover support pedestal and, more particularly, to such a support pedestal which can be mounted in a central hole in a radial wall of the wheel which in turn is capable of snuggly receiving a circular hub element of an axle when the wheel is mounted on the axle.

2. Description of the Prior Art

While there have heretofore been a number of devices employed to provide support for a wheel cover at the center of a wheel, they have tended to include features that have limited their applicability to specific wheel designs and/or wheel mounting configurations.

For example, U.S. Pat. Nos. 4,061,400; 4,179,163 and 4,221,435 disclose cup-shaped support pedestals which include a flanged, circular base which is to be mounted or pressed fitted into a central, circular hole in the radial wall of a wheel. However, for some wheel configurations, the axle is provided a piloting flange which is closely received within the hole when the wheel is mounted thereon. In fact, the size of the flange and size of the hole is so close in some cases that the wheels have had a tendency to "freeze" on the flange complicating removal of the wheel from the axle. In these configurations, there is simply not enough space for the inclusion of such a cup-shaped pedestal.

Accordingly, some support pedestals had been designed to be secured to the wheel at the threaded lugs used primarily to secure the wheel to the axle. U.S. Pat. Nos. 3,710,733; 3,918,764 and 4,274,679 disclose such arragements but produce the added disadvantage of complicating wheel mounting and removal since the pedestal must also be mounted or removed with the wheel.

Still another wheel cover support pedestal design employs lug nuts for basic support but in a manner which does not require that the pedestal be mounted with the wheel. U.S. Pat. No. 3,833,266 discloses a pedestal having notched leg portions which are installed in the grooves of specifically designed lug nuts after the wheel is mounted. Although the pedestal can be mounted or removed without disturbing a wheel already mounted on an axle, this configuration requires special lug nuts and still must be removed before the wheel can be removed.

Because of the problems encountered with the wheel "freezing" on the piloting flange mentioned hereinabove, a number of wheel manufacturers have begun to provide notched or scalloped holes in the annular wall of the wheel. Such an arrangement allows sufficient contact area with the piloting flange for proper alignment and mounting of the wheel while reducing the liklihood that the wheel will seize or "freeze" on the piloting flange. In any case, there remains a need for a wheel cover support pedestal which can be simply installed on a wheel without interfering with the mounting or removal of the wheel or needing any special wheel mounting configuration.

SUMMARY OF THE INVENTION

It is therefore an objective of this invention to provide a wheel cover support pedestal which is simple to install, requires no special wheel mounting configuration and will not interfere with wheel mounting and removal.

These and other objectives of the invention are provided in a preferred embodiment therefor in the form of a wheel cover support pedestal which is capable of being mounted centrally on a wheel of the type which includes a radial wall with a central hole therethrough. The hole is capable of snuggly receiving a circular hub element of an axle therein when the wheel is mounted on the axle. The hole is defined by an interior periphery of the radial wall to be generally circular with the periphery including a plurality of circumferentially spaced notches to provide a gap between the periphery at each of the notches and the circular hub element. The wheel cover support pedestal includes a center portion including means for securing a center section of a wheel cover thereto. A plurality of leg portions extend from the center portion. Each of the leg portions is capable of being aligned with one of the plurality of notches and includes an extended end which is received within a corresponding gap. The extended end has a radially extending foot to make overlying contact with an inboard side of the radial wall adjacent the gap to cause the center portion to be disposed axially outwardly of an outboard side of the radial wall of the wheel when the wheel cover support pedestal is mounted thereon.

DETAILED DESCRIPTION OF THE PREFERRED EMBODIMENT

Figure 1:
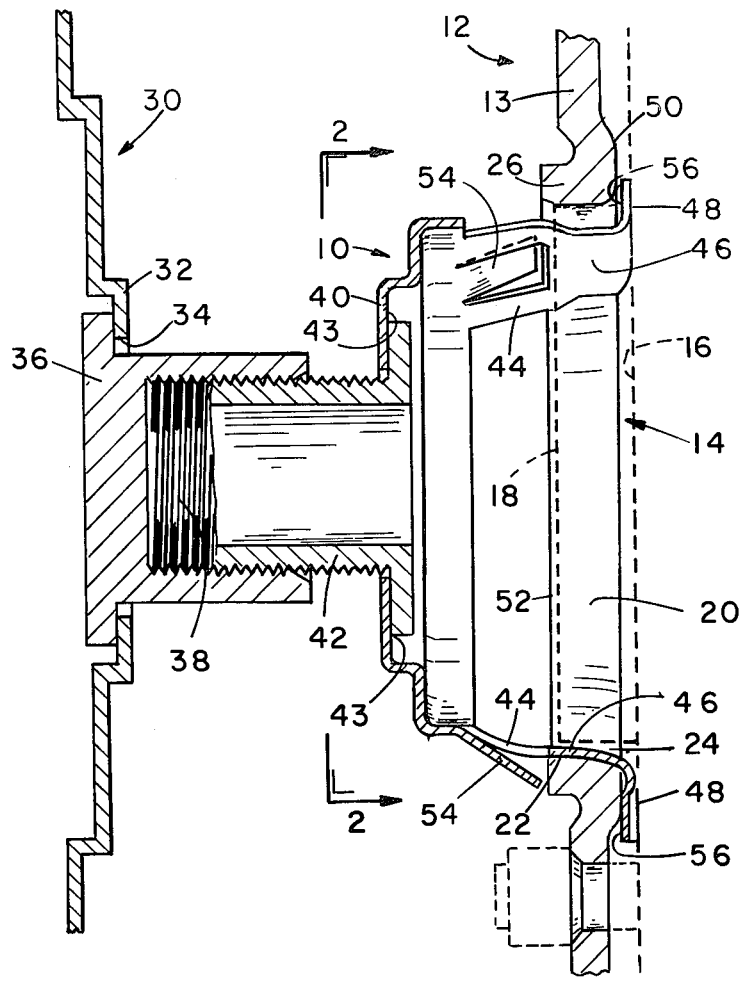
FIG. 1 is a sectional side view of the preferred wheel cover support pedestal including various features of the invention.
Figure 2:
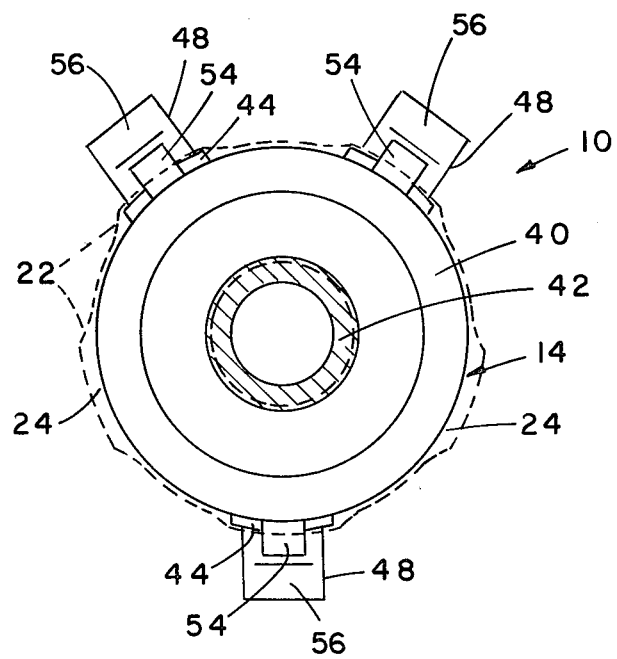
FIG. 2 is a view of the wheel cover support pedestal as seen along line 2—2 of FIG. 1.

As seen in FIGS. 1 and 2, the preferred wheel cover support pedestal 10 is capable of being mounted on a wheel 12 which has a central hole 14 in the radial wall 13 thereof. The wheel 12 is mounted on mounting face 16 (shown in phantom) of an axle with the hole 14 being snuggly received on a piloting flange or other circular hub element 18 of the axle (also shown in phantom). However, the hole 14 is defined by an interior periphery 20 of the radial wall 13 to be only generally circular. The periphery 20 is provided a plurality of circumferentially spaced notches 22 to provide a gap 24 between the periphery 20 at each of the notches 22 and the circular hub element 18. As mentioned hereinabove, providing the hole 14 with this configuration, has been found to eliminate "freezing" of the wheel 12 on the circular hub element 18 while still allowing the circular hub element 18 to pilot the wheel 12 during mounting on the axle.

Although the wheel 12 which is shown in FIG. 1 includes an outwardly turned flange 26 which acts as the periphery 20, there are other ways utilized by manufacturers to satisfy the same objective. For example, in some wheel configurations, the central hole is cut or formed with a scalloped edge with no outwardly turned flange 26 being provided. In either case, however, many wheels presently being employed and others proposed in the future will include a non-circular hole therethrough to provide circumferentially spaced gaps around a circular hub element. Additionally, the wheel 12 is shown in FIGS. 1 and 2 to includes five evenly-spaced notches 22, which are aligned with the five lug holes used for mounting the wheel. However, if the wheel were provided a different numbers or arrangements of notches, it could still include a sufficient number of gaps between the periphery and the circular hub element to allow an embodiment of the wheel cover support pedestal of the present invention to be advantageously employed.

Similarly, the wheel cover 30 may be any one of a number of types of wheel covers which include a centrally located means for either locking or securing the wheel cover to the wheel. Some wheel covers include a plurality of clip elements at the outer periphery for making gripping contact with the rim for basically securing the wheel cover to the wheel. However, some of these wheel covers also include a centrally located element which is capable of making locking engagement with a center portion of the wheel to prevent undesired removal or theft of the wheel cover. On the other hand, there are other wheel cover devices which specifically include a centrally located element for mounting the wheel cover to a central location on the wheel for primary support thereon. As seen in FIG. 1, the preferred wheel cover 30 could be either of these types.

Specifically, the center section 32 of the wheel cover 30 includes a hole 34 therethrough for the receipt of a wheel cover securing nut 36. In some front drive automobiles, the drive axle spindle has an extended threaded portion which can serve as a means for directly securing or locking the center section of the wheel cover thereto. Therefore, the nut 36 includes an interior threaded cavity 38 which could be received on the extended end of such an axle. Although the wheel cover support pedestal 10 would not be utilized on such an axle, it would be appropriate to include a wheel cover support pedestal of the present invention on a rear wheel configuration of these automobiles.

The preferred wheel cover support pedestal 10 includes a center portion 40 which is provided a means for securing the center section 32 of a wheel cover 30 thereto in the form of an extended element 42. Although part of the center portion 40 is made of sheet metal and integrally formed with most of the remaining portions of the preferred pedestal 10, the extended element 42 is separately formed and may be secured by spot welding a 43 to the remainder of the center portion 40. Preferably, the extended element 42 is threaded in the same manner as the extended end of the forward, drive axle shaft configuration mentioned above so that the covers are interchangeable at all four wheels. However it should be understood that although this configuration is shown for the preferred embodiment of the invention, any number of other types of arrangements might also be employed. For example, where the automobile does not include such a front drive axle configuration, a wheel cover support pedestal with a different design might be employed at all four wheels. Since the securing device mounted on the wheel cover may not be identical to the nut 36, the means for securing the center section of the wheel cover to the center portion 40 might be of a matching but different form while still basically providing the desired function of supporting the wheel cover.

More significantly, the preferred wheel cover support pedestal 10 includes a plurality of leg portions 44 which extend from the center portion 40 toward the hole 14 in the wheel 12. Each of the leg portions 44 is aligned with one of the notches 22 and includes an extended end 46 which is capable of being received within the corresponding gap 24 associated with its notch 22. Each extended end 46 includes a radially extending foot 48 to make overlying contact with an inboard side 50 of the radial wall 13 adjacent the gap 24. When the wheel cover support pedestal 10 is installed from the inboard side 50 of the wheel 12 through the hole 14 to cause the overlying contact at the feet 48, the center portion 40 is disposed axially outwardly of the outboard side 52 of the radial wall 13 of the wheel 12 for receipt of the wheel cover 30 thereon.

The preferred wheel cover support pedestal 10 includes several features to insure that it will be positively and firmly retained in the hole 14 of the wheel 12. For example, each of the leg portions 44 is made of a resilient-type of sheet metal and formed to produce a radially outward biasing force when mounted in the hole 14. When the extended ends 46 are received within the gaps 24, the biasing force causes the extended ends 46 to be held against the periphery 20 at each of the notches 22.

Additionally, each of the preferred leg portions 44 is provided a lanced tab 54 which is outwardly formed to extend radially to overlie the outboard side 52 of the radial wall 13 when the wheel cover support pedestal 10 is fully installed with the radially extending foot 48 making contact with the inboard side 50 of the radial wall 13. The tabs 54 are also resiliently biased to be capable of radial inward deflection by the periphery 20 at the notch 22 as the leg portion 44 is being installed in the gap 24 from the inboard side 50 of the wheel 12. Although in the preferred wheel cover device 10 there is provided an identical tab 54 on each of the leg portions 44, it would be possible to provide tabs which are located at different, axially spaced positions so that the wheel cover support pedestal would include only one such tab which is correctly positioned to make contact with the outboard side of the wheel. Arranging the tabs in this manner would insure that at least one would be employed for retention of the same wheel cover support pedestal on any number of wheels from different manufacturers which might include different radial wall thicknesses at the central holes therethrough.

To further insure positive retention of the wheel cover support pedestal 10 within the hole 14, each of the radially extending feet 48 is provided a raised portion 56 between the inboard side 50 of the wheel 12 and the mounting face 16. When the wheel 12 is tightly secured to the mounting face 16, the raised portions 56 will be at least partially deflected to produce sufficient friction at the radially extending feet 48 to prevent any undesired movement or rattling of the wheel cover support pedestal 10 in the hole 14.

It should be clear from the discussion hereinabove that an alternative wheel cover support pedestal may be provided with a different number of leg portions. For example, if the wheel includes an arrangement of four, rather than five, evenly-spaced notches in the hole thereof, the support pedestal may be provided four corresponding leg portions rather than the preferred three as shown in FIGS. 1 and 2. Additionally, while the preferred radially extending tab 54 is struck from the leg portion 44 there may be provided other forms of tabs which would serve the same function of retaining the wheel cover support pedestal in the hole of the wheel. Clearly, these and other alternatives of the invention may be provided without departing from the invention as claimed.

I claim:

1. A wheel cover support pedestal capable of being mounted centrally on a wheel of the type which includes a radial wall with a central hole therethrough, said hole being capable of snuggly receiving a circular hub element of an axle therein when said wheel is mounted on a mounting face of said axle, said hole being defined by an interior periphery of said radial wall to be generally circular with said periphery including a plurality of circumferentially spaced notches to provide a gap between said periphery at each of said notches and said circular hub element, said wheel cover support pedestal comprising:
 a center portion including means for securing a center section of a wheel cover thereto;
 a plurality of leg portions extending from said center portion, each of said leg portions being capable of being aligned with one of said plurality of said notches and including an extended end being received within a corresponding said gap; and
 said extended end having a radially extending foot to make overlying contact with an inboard side of said radial wall adjacent said gap to cause said center portion to be disposed axially outwardly of an outboard side of said radial wall of said wheel when said wheel cover support pedestal is mounted thereon, said radially extending foot being tightly secured between said inboard side of said radial wall and said mounting face of said axle when said wheel is mounted on said mounting face of said axle.

2. The wheel cover support pedestal as set forth in claim 1, wherein said leg portions are made of resilient metal and formed to produce a radially outward biasing force when said extended ends are received within said gaps to cause said extended ends to be held against said periphery at said notches.

3. The wheel cover support pedestal as set forth in claim 1, wherein at least one of said leg portions includes a radially extending tab to overlie said outboard side of said radial wall when said radially extending foot is making contact with said inboard side of said radial wall.

4. The wheel cover support pedestal as set forth in claim 3, wherein said radially extending tab is resiliently biased to be capable of radial inward deflection by said periphery at said notch as said leg portion is being installed in said gap from said inboard side of said radial wall of said wheel.

* * * * *